(12) United States Patent
Sohl

(10) Patent No.: US 6,695,756 B1
(45) Date of Patent: *Feb. 24, 2004

(54) ELASTIC ROLL AND A METHOD FOR THE MANUFACTURE OF SUCH A ROLL

(75) Inventor: Carsten Sohl, Fredericia (DK)

(73) Assignee: Voith Paper Patent GmbH, Heidenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/697,185

(22) Filed: Oct. 27, 2000

(30) Foreign Application Priority Data

Oct. 29, 1999 (DE) .......................... 199 52 320

(51) Int. Cl.⁷ .................. B25F 5/02; B27N 9/00; B65D 0/00; D02G 3/00
(52) U.S. Cl. ................. 492/56; 492/53; 492/50; 428/375; 428/36.2; 428/36.3; 428/900
(58) Field of Search ............... 428/375, 35.9, 428/36.2, 36.3, 900; 492/56, 53

(56) References Cited

U.S. PATENT DOCUMENTS

| | | | | |
|---|---|---|---|---|
| 5,061,533 A | * | 10/1991 | Gomi et al. | 428/110 |
| RE35,081 E | * | 11/1995 | Quigley | 428/36.2 |
| 6,315,704 B1 | * | 11/2001 | Sohl | 492/53 |
| 6,319,185 B1 | * | 11/2001 | Sohl | 493/141 |
| 6,338,706 B1 | * | 1/2002 | Sohl | 492/53 |
| 6,379,290 B1 | * | 4/2002 | Sohl | 29/895.21 |

FOREIGN PATENT DOCUMENTS

| | | |
|---|---|---|
| DE | 3703564 | 8/1987 |
| DE | 4312827 | 5/1994 |
| DE | 29722778 | 5/1998 |
| DE | 19736575 | 3/1999 |

* cited by examiner

Primary Examiner—Cynthia H. Kelly
Assistant Examiner—Lawrenc Ferguson
(74) Attorney, Agent, or Firm—Greenblum & Bernstein, P.L.C.

(57) ABSTRACT

A method for manufacturing an elastic roll is provided including winding at least one fiber bundle comprising of a plurality of fibers to form fiber layers onto a hardroll core, the fiber layers being formed to lie on top of one another, with a direction of winding of the fibers being essentially parallel to one another and at an angle to a peripheral direction of the roll core, wherein fiber layers lying on top of one another are wound alternately in an identical but opposite manner to form a cross-composite layer; winding a damping fiber layer with fiber bundles of a uniform angular position onto the cross-composite layer, with an angular position of these fiber bundles being substantially flatter, relative to a longitudinal axis of the roll, than the angular positions of the fiber bundles of the cross-composite layer; and winding another cross-composite layer again onto the damping fiber layer.

36 Claims, 2 Drawing Sheets

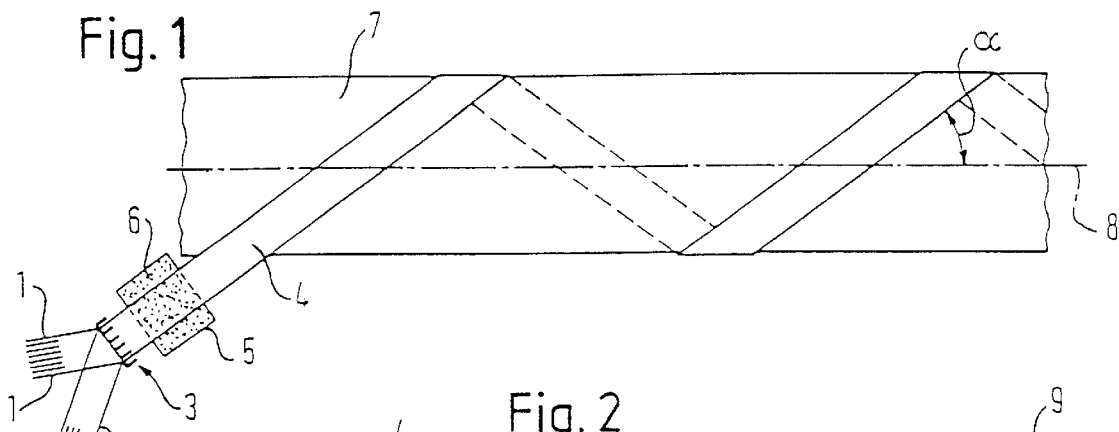
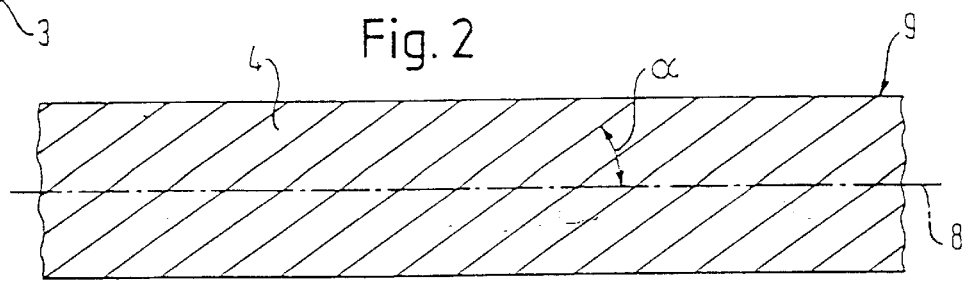
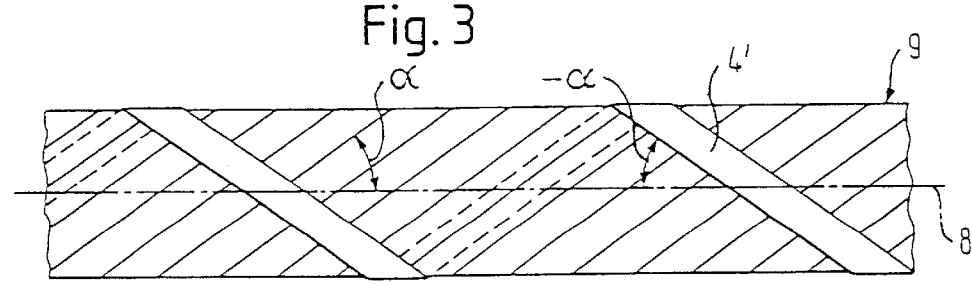
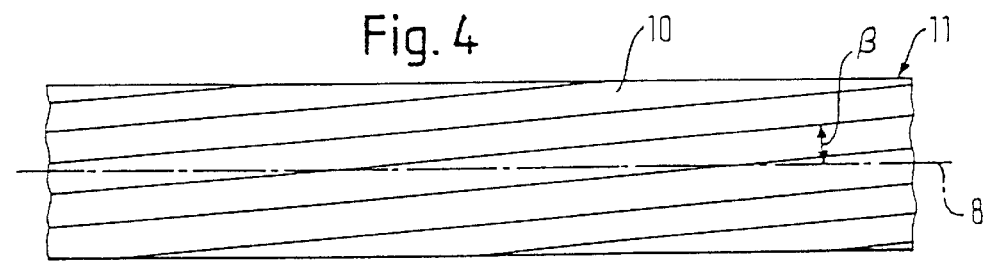
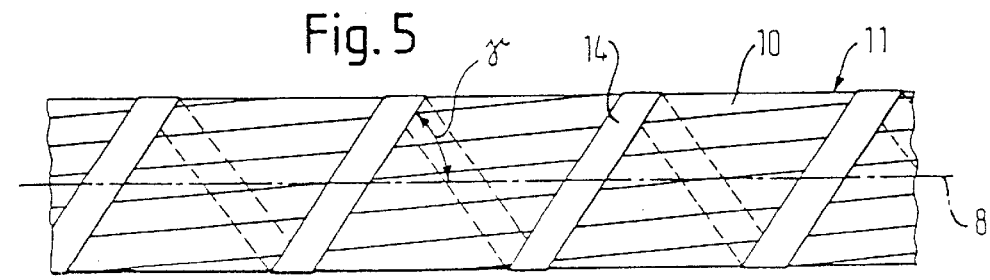

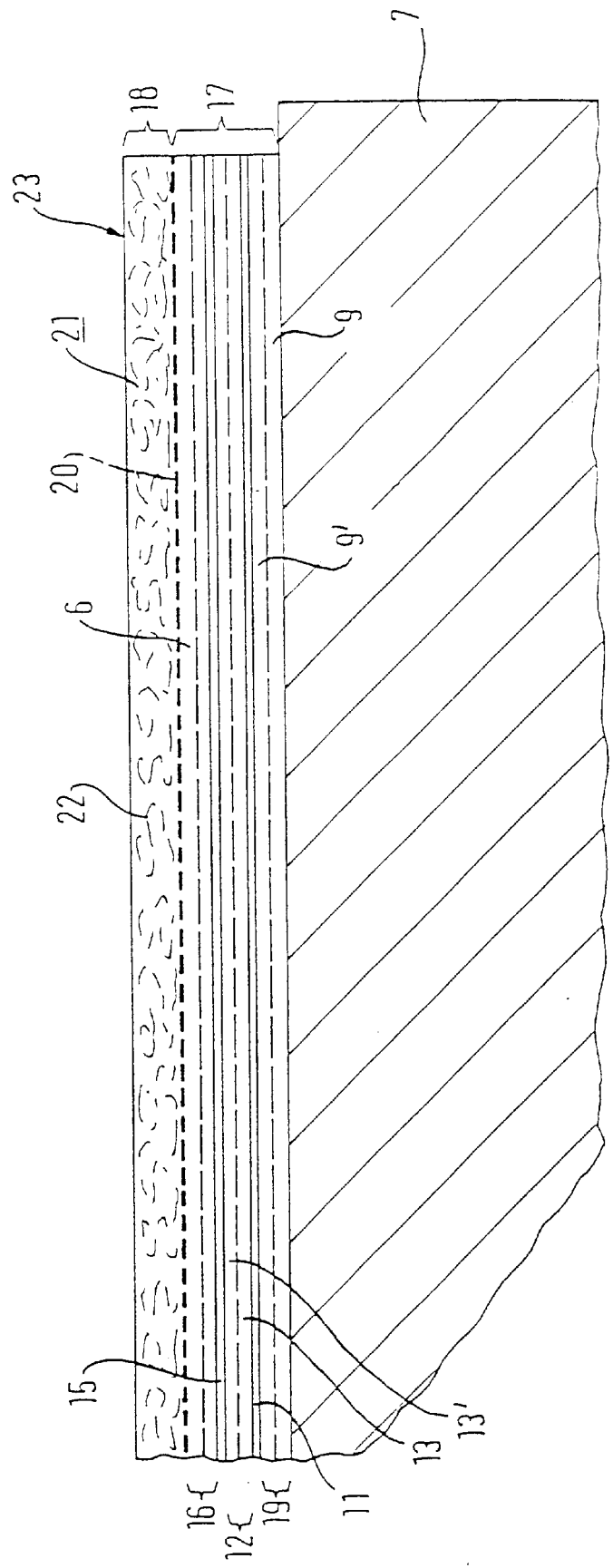

ELASTIC ROLL AND A METHOD FOR THE MANUFACTURE OF SUCH A ROLL

CROSS-REFERENCE TO RELATED APPLICATIONS

The present application claims priority under 35 U.S.C. §119 of German Patent Application No. 199 52 320.7, filed on Oct. 29, 1999, the disclosure of which is expressly incorporated by reference herein in its entirety.

BACKGROUND OF THE INVENTION

1. Field of the Invention

The present invention relates to a method for the manufacture of an elastic roll having a hard roll core including in particular of metal and an elastic covering layer, wherein, to form the elastic covering layer, a fiber bundle including of a plurality of fibers is wound onto the roll core to form fiber layers lying on top of one another, with the direction of winding of the fibers being essentially parallel to one another and at an angle to the peripheral direction of the roll core. The invention is further directed to a roll, in particular for the smoothing of paper webs, having a hard roll core including in particular of metal and being provided on its outside with an elastic covering layer which comprises a plurality of fiber layers lying radially on top of one another and comprising of a soft matrix material with fibers embedded therein.

2. Discussion of Background Information

Elastic rolls of this kind are used, for example, in the satining of paper webs. Here, one elastic roll forms, in each case together with a hard roll, a press gap through which the paper web to be treated is guided. While the hard roll has a very smooth surface including, for example, of steel or chilled cast iron and is responsible for the smoothing of that side of the paper web facing it, the elastic roll acting on the opposite side of the paper web effects a homogenizing and compacting of the paper web in the nip. The order of magnitude of the rolls ranges from lengths of about 3 to 12 m and diameters from about 450 to 1500 mm. They can withstand line forces of up to about 600 N/mm and compressive stresses of up about to 130 N/mm$^2$.

As the trend in paper manufacturing is towards performing satining in an online operation, i.e. towards guiding the paper web exiting the paper machine or coating machine directly through the paper smoothing apparatus (calender), higher demands than previously are made on the rolls of the smoothing apparatus, particularly on the elastic covering layers of the rolls. As a result of the high transportation speeds of the paper web required in online operation and the high rotation speeds of the calender rolls associated with this, nip frequencies, that is the frequencies with which the covering is compressed and relieved of its load again, are achieved, which lead to resonances in the roll jacket or in the rolls.

These resonances lead to vibrations of the calender rolls which lead to transverse stripes perpendicular to the production direction, so-called "barrings" in the surface of the elastic covering of the rolls after a certain running time. These transverse stripes can typically have a width of about 3 to 10 mm in the peripheral direction and a spacing of about 5 to 10 mm.

The vibrations are caused by irregularities which can be caused, for example, by an uneven breast box, irregularities in the roll drive or by other irregularities in the running of the roll. The transverse stripes in the covering layer can occur both due to plastic deformation of the matrix material and to irregular wear. These transverse stripes in the covering layer finally lead to corresponding pressure marks on the calendered paper web so that the quality of the paper web is not sufficient.

The transverse stripes in the covering layer of the roll have to be eliminated by grinding the covering layer which results in a much lower service life of the roll coverings.

SUMMARY OF THE INVENTION

It is an aspect of the invention to provide a method for the manufacture of an elastic roll and to provide such an elastic roll where the occurrence of barrings is avoided.

The part of the aspect relating to the method is satisfied in accordance with the invention, starting from a method of the kind initially mentioned, by at least two fiber layers lying on top of one another being wound alternately in an identical but opposite manner to form a cross-composite layer, i.e. by the angular positions relative to the longitudinal axis of the roll of the fiber bundles of two fiber layers wound in an identical but opposite manner being symmetrical to the cross-sectional surface of the roll, by a damping fiber layer with fiber bundles being wound onto the cross-composite layer, with the angular position of this fiber bundle being substantially flatter than the angular positions of the fiber bundles of the cross-composite layer and by a cross-composite layer again being wound onto the damping fiber layer.

A roll made in accordance with the invention is characterized by the fibers of the fiber layers each, extending at an angle to the longitudinal axis and essentially parallel to one another, by at least two fiber layers lying on top of one another forming in each case a cross-composite layer, with the fibers of the individual fiber layers each extending alternately in an identical but opposite manner, i.e. by the angular positions of the fibers relative to the longitudinal axis of the roll being symmetrical to the cross-sectional surface of the roll, by the covering layer including at least two cross-composite layers, and by a damping fiber layer with fibers of a uniform angular position being provided between the cross-composite layers, with the angular position of these fibers being substantially flatter than the angular positions of the fibers of the cross-composite layers.

The occurrence of barrings is therefore avoided in accordance with the invention by a special winding technique. The rolls manufactured using the winding technique in accordance with the invention have the property of a vibration of the roll being avoided by special damping fiber layers inside the covering layer. While the cross-composite layers including in each case fiber layers wound in an identical but opposite manner have a relatively low E modulus, the damping fiber layers wound in each case in a uniform angular position have a very high stiffness, with pressure forces acting on the covering layer being transferred to the covering layer as torsion due to the very flat angular position of the fiber bundles. In this way, when pressure is applied, minimum torsion of the covering layer occurs, whereby vibrations in the covering layer and so the occurrence of barrings is avoided. The impacts which occur during operation due, for example, to irregularities in the breast box or to irregularities in the drive, are thus taken up by the specially designed damping fiber layers.

In accordance with an advantageous embodiment of the invention, the fiber bundle is wound onto the roll core in a multi-layer design with an essentially uniform angular position to form in each case one of the fiber layers of the cross-composite layers. The fiber layers of the cross-composite layers are thus made in a multi-layer design in each case, i.e. they comprise in each case several layers of fibers of an essentially uniform angular position wound over one another. The required thickness and so the required elasticity of the covering layer is achieved in this way.

At least two or more of these preferably multi-layer fiber layers having a uniform angular position are then put together to form one cross-composite layer in each case. A high stiffness of the covering layer is achieved due to the winding of the individual fiber layers within one cross-composite layer in an identical but opposite manner.

The fiber bundle is preferably wound onto the roll core in one layer to form the damping fiber layer. The damping fiber layers are in this way made substantially thinner than the cross-composite layers so that the stiffness of the covering layer is not disadvantageously reduced. Nevertheless, when pressure is exerted, it is achieved by the thin damping fiber layers, which are not wound in a cross-composite, but in a uniform angular position, that the vibrations in the covering layer and so the occurrence of barrings are avoided.

Within the meaning of the present invention, one-layer defines that when the damping fiber layer is wound, the fiber bundle is wound onto the roll core until the cross-composite layer underneath it is fully covered. The fiber bundle can subsequently, for example, be cut off at the roll end.

In accordance with another advantageous embodiment of the invention, several cross-composite layers and damping fiber layers are wound on top of one another, with each cross-composite layer being followed by a damping fiber layer. Generally, a plurality of corresponding layers can be provided, with a cross-composite layer preferably being wound as the radially outermost layer.

Particularly when the fiber bundles of two damping fiber layers following one another are wound in identical but opposite manners, the covering layer has optimum damping properties since the relevant torsion of the two damping fiber layers following one another is in each case directed in the opposing direction so that the torsion forces which occur cancel each other out over the whole covering layer. The surface of the elastic covering layer remains free of torsion in this way.

The damping fiber layers are advantageously wound with a substantially smaller radial thickness than the cross-composite layers. The damping fiber layers in this way have a very high E modulus, whereby the translation of the radial impacts acting on the covering layer into a torsional movement is further improved.

In accordance with another preferred embodiment of the invention, radially outer cross-composite layers are wound with a steeper angular position than radially inner cross-composite layers. An optimum thermal expansion behavior of the roll in accordance with the invention is achieved by these outwardly increasing angular positions. A radially inner cross-composite layer with an angular position of about ±45°, a damping fiber layer following thereon with an angular position of about +8°, a further cross-composite layer with an angular position of about ±65°, another damping fiber layer with about −8° and, finally, a further cross-composite layer with an angular position of about ±75° can, for example, be wound, with the damping fiber layers preferably being wound substantially thinner than the cross-composite layers.

In accordance with another advantageous embodiment of the invention, a radially inner connecting layer is first applied to the roll core and subsequently a radially outer functional layer applied to the connecting layer to form the covering layer. The physical properties of the two layers required in each case can be ideally set by a separation into a connecting layer and functional layer. For example, the outer functional layer should conventionally have high elasticity, while the inner connecting layer should have high stiffness. To improve the thermal conductivity of the covering layer and so the dissipation of unwanted heat from the covering layer, fiber materials are used which have a higher conductivity than the matrix material used. In addition, fillers can be embedded in the elastic material which also have a higher thermal conductivity than the matrix material.

The fibers are preferably surrounded with a soft matrix material, in particular a resin/hardener combination, prior to the winding on the roll core to manufacture the roll. This can be done, for example, by the fibers being drawn through a resin/hardener bath. The fibers can, however, generally be wound onto the roll core in an essentially dry condition and be subjected to a soft matrix material, in particular to a resin/hardener combination, and in particular be fully embedded in the matrix material, during or after winding.

The fiber layers can be formed by winding single fibers, fiber bundles or fiber rovings, with a fiber layer being able to be wound within the meaning of the present invention both as one layer, i.e. wound singly, and in multiple layers, i.e. wound several times.

According to an aspect of the present invention, a method for manufacturing an elastic roll is provided including winding at least one fiber bundle comprising of a plurality of fibers to form fiber layers onto a hardroll core. The fiber layers being formed to lie on top of one another, with a direction of winding of the fibers being essentially parallel to one another and at an angle to a peripheral direction of the roll core. Wherein fiber layers lying on top of one another are wound alternately in an identical but opposite manner to form a cross-composite layer. Furthermore, the invention includes winding a damping fiber layer with fiber bundles of a uniform angular position onto the cross-composite layer, with an angular position of these fiber bundles being substantially flatter, relative to a longitudinal axis of the roll, than the angular positions of the fiber bundles of the cross-composite layer; and winding another cross-composite layer again onto the damping fiber layer.

According to another aspect of the present invention, the hard roll comprises metal. Additionally, other aspects of the present invention include wherein angular positions relative to a longitudinal axis of the roll of the fiber bundles of two fiber layers wound in an identical but opposite manner are symmetrical to a cross-sectional surface of the roll.

In another aspect of the present invention, the fiber bundle is wound onto the roll core in multiple layers with an essentially uniform angular position to form in each case one of the fiber layers of the cross-composite layers. According to a further aspect of the present invention, the fiber bundle is wound onto the roll core in one layer to form the damping fiber layer. In another aspect of the present invention, different cross-composite layers are wound with angular positions differing in magnitude.

According to a still further aspect of the present invention, several cross-composite layers and damping fiber layers are wound over one another, with each cross-composite layer being followed by a damping fiber layer. Further aspects of the invention include wherein a cross-composite layer is wound as the radially outermost layer. According to other aspects of the present invention, the fiber bundles of two damping fiber layers following one another are wound in an identical but opposite manner.

According to another aspect of the present invention, the damping fiber layers are wound with an essentially smaller radial thickness than the cross-composite layers. According to a further aspect of the present invention, radially outer cross-composite layers are wound with a steeper angular position than radially inner cross-composite layers. According to a still further aspect of the invention, the cross-composite layers are wound with angular positions of approximately ±40° to approximately ±80°.

According to an aspect of the present invention, the damping fiber layers are wound with an angular position of approximately 3° to approximately 12° or from approximately −3° to approximately −12°. According to another aspect of the present invention, the damping fiber layers are wound with an angular position of approximately 8° or of approximately −8°. Additionally, other aspects of the present invention are provided including wherein the damping fiber layers are wound with angular positions essentially equal in amount.

In another aspect of the present invention, a radially inner connecting layer is first applied to the roll core and subsequently a radially outer functional layer is applied to the connecting layer to form an elastic covering layer. According to a further aspect of the present invention, cross-composite layers and damping fiber layers are wound onto the roll core to form at least one of a connecting layer and functional layer. In another aspect of the present invention, at least one of carbon and metal and glass and aramide fibers or mixtures of these fiber materials are used as fibers.

According to a still further aspect of the present invention, the fiber bundles are formed by fiber rovings with one roving comprising in each case a plurality of fibers of the same kind lying next to one another. In another aspect of the present invention, the fibers are surrounded by a soft matrix material. According to a still further aspect of the present invention, the soft matrix material is a resin and hardener combination.

Further aspects of the invention include wherein the soft matrix material is drawn through a resin and hardener bath, prior to winding onto the roll core. According to other aspects of the present invention, the fibers are wound onto the roll core in an essentially dry condition and are exposed to a soft matrix material and completely embedded in the matrix material, during or after winding onto the roll core. According to another aspect of the present invention the soft material matrix is a resin and hardener combination.

According to a further aspect of the present invention, a roll is provided having a hard roll core and an elastic covering layer on the outside of the core, the elastic covering including a plurality of fiber layers lying radially on top of one another, including a soft matrix material with fibers embedded therein. Fibers of the fiber layers each extend at an angle to a longitudinal axis of the roll core and essentially parallel to one another. At least two fiber layers lying on top of one another form in each case a cross-composite layer, with the fibers of the individual fiber layers each extending alternately in an identical but opposite manner. The covering layer including at least two cross-composite layers. A damping fiber layer with fibers of a uniform angular position is provided between the cross-composite layers, with angular position of these fibers being substantially flatter than angular positions of the fibers of the cross-composite layers.

According to a further aspect of the present invention, the roll is used for smoothing paper webs. According to a still further aspect of the invention, the roll core comprises metal. According to an aspect of the present invention, angular positions of the fibers relative to the longitudinal axis of the roll core are symmetrical to a cross-sectional surface of the roll.

According to an aspect of the present invention, the fiber layers of the cross-composite layers are each formed in multiple layers. According to another aspect of the present invention, the fiber layers of the cross-composite layers comprise in each case several layers of fibers wound on top of one another, with fibers of one fiber layer each having an essentially uniform angular position. In another aspect of the present invention, the damping fiber layer is made in one layer. According to a further aspect of the present invention, angular positions of the fibers are different in magnitude for different cross-composite layers.

According to a still further aspect of the present invention, the covering layer comprises at least two cross-composite layers and at least two damping fiber layers. In another aspect of the present invention, the covering layer comprises three cross-composite layers. In another aspect of the present invention, the outside of the covering layer is formed by a cross-composite layer. According to a further aspect of the present invention, the fibers of two damping fiber layers following, one another are wound in an identical but opposite manner.

In another aspect of the present invention, the radial thickness of the damping fiber layers is substantially smaller than the radial thickness of the cross-composite layers. Further aspects of the present invention include wherein the damping fiber layers have a radial thickness of approximately 0.1 mm to approximately 1 mm. According to an aspect of the present invention, the damping fiber layers have a radial thickness of approximately 0.25 mm to approximately 0.6 mm. According to another aspect of the present invention, the cross-composite layers have a radial thickness of approximately 1.5 mm to approximately 3 mm. In another aspect of the present invention, the cross-composite layers have a radial thickness of approximately 2 mm.

According to a still further aspect of the present invention, the angular positions of the fibers of radially outer cross-composite layers are steeper than the angular positions of the fibers of radially inner cross-composite layers. Further aspects of the invention include wherein the angular positions of the cross-composite layers are approximately ±40° to approximately ±80°. Further aspects of the invention include wherein the angular positions of the damping fiber layers are approximately 3° to 12° or approximately −3° to −12°.

According to other aspects of the present invention, the angular positions of the damping fiber layers are approximately 8° or −8°. According to another aspect of the present invention, the angular positions of the damping fiber layers are essentially equal in amount. According to an aspect of the present invention, the covering layer comprises a radially outer functional layer and a radially inner connecting layer to connect the functional layer to the roll core. According to another aspect of the present invention, at least one of the connecting layer and functional layer comprise cross-composite layers and damping fiber layers.

Additionally, other aspects of the present invention include the matrix material being plastic. In another aspect of the present invention, the matrix material is a plastic one of a thermosetting plastic or a thermoplastic. According to a still further aspect of the present invention, the matrix material comprises a resin and hardener combination. Further aspects of the invention include wherein the fibers are combined to fiber bundles or fiber rovings, with one roving in each case comprising a number of fibers of the same kind lying next to one another.

According to other aspects of the present invention, the fibers are made as at least one of glass, carbon, metal and aramide fibers or of mixtures of these fiber materials. Further aspects of the invention include the fiber content of the connecting layer is approximately 40 to 70 vol. %. According to another aspect of the present, the fiber content of the connecting layer is approximately 50 to 60 vol. %. According to a still further aspect of the invention, the fiber content of the functional layer is approximately 5 to 30 vol. %.

According to an aspect of the present invention, the fiber content of the functional layer is approximately 8 to 20 vol. %. According to another aspect of the present invention, the fibers of at least one of said functional layer and the connecting layer have higher thermal conductivity than the matrix material in which they are embedded.

Additionally, other aspects of the present invention are provided including a roll having a hard roll core and an elastic covering layer on the outside of said core, the method for manufacturing the elastic covering layer, including forming the elastic covering layer by winding onto the roll core at least one fiber bundle including of a plurality of fibers to form fiber layers lying on top of one another, with a direction of winding of the fibers being essentially parallel to one another and at an angle to a peripheral direction of the roll core. At least two fiber layers lying on top of one another are wound alternately in an identical but opposite manner to form a cross-composite layer; winding a damping fiber layer with fiber bundles of a uniform angular position onto the cross-composite layer, with an angular position of these fiber bundles being substantially flatter than the angular positions of the fiber bundles of the cross-composite layer. And, winding a cross-composite layer again onto the damping fiber layer, the elastic covering layer including a plurality of fiber layers lying radially on top of one another; and a soft matrix material with fibers embedded therein; wherein fibers of the fiber layers each extend at an angle to a longitudinal axis of the roll core and essentially parallel to one another. At least two fiber layers lying on top of one another form in each case a cross-composite layer, with the fibers of the individual fiber layers each extending alternately in an identical but opposite manner, wherein the covering layer comprises at least two cross-composite layers. A damping fiber layer with fibers of a uniform angular position is provided between the cross-composite layers, with angular position of these fibers being substantially flatter than angular positions of the fibers of the cross-composite layers.

Other exemplary embodiments and advantages of the present invention may be ascertained by reviewing the present disclosure and the accompanying drawing.

BRIEF DESCRIPTION OF THE FIGURES

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 1 to 5 different states of a roll made in accordance with the invention during its manufacture; and FIG. 6 a partial longitudinal section through a roll made in accordance with the invention.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than necessary for the fundamental understanding of the present invention, the description taken with the drawings making apparent to those skilled in the art how the several forms of the present invention may be embodied in practice.

FIG. 1 shows how different fibers 1, 2 for example, glass, carbon or aramide fibers, are led over a comb-like collecting unit 3 and combined to a fiber bundle 4, with the fiber bundle 4 being guided through a schematically represented impregnating device 5 in which the individual fibers 1, 2 are coated with a liquid matrix material 6 so that they are essentially completely surrounded by the matrix material 6. The matrix material can be a plastic, in particular a resin/hardener combination. Uniform fibers can also be used instead of different fibers 1, 2 to make the fiber bundle 4.

The fiber bundle 4 completely coated with the matrix material 6 is wound at an angle onto the roll core 4 so that it forms an angle $\alpha$ with respect to the longitudinal axis 8 of the roll core 7. The winding procedure is performed over the total length of the roll core 7 until the fiber bundle 4 is led over a winding core at the end (not shown) of the roll core 7 and led back in the opposite direction, with the fiber bundle being preferably led so that it abuts the previously wound fiber bundle 4 end to end.

This winding procedure is repeated until the roll core 7 is completely wound over by the fiber bundle 4, with the winding procedure optionally being able to be ended after a one-layer complete winding over or after a repeated multiple winding over. A closed first fiber layer 9, shown in FIG. 2, whose fibers 1, 2, all form essentially the same angle $\alpha$ with respect to the longitudinal axis of the roll core 7, is formed by the fiber bundle 4 and the matrix material 6 surrounding the fiber bundle 4, with the angle $\alpha$ being able to be, for example, about +45° and the thickness of the fiber layer 9 being able to be preferably approximately 1 mm.

In the next processing step, a further fiber bundle 4' is wound onto the first fiber layer 9, with the fiber bundle 4' being wound in an equal but opposite manner to the fiber bundle 4 at an angle $-\alpha$ with respect to the longitudinal axis 8 on the roll core 7 until the first fiber layer 9 is completely covered by a further fiber layer 9' (FIG. 6). The two fiber layers 9, 9', which have essentially the same radial thickness and are wound in an identical but opposite manner, form a cross-composite layer 19 (FIG. 6). While the cross-composite layer 19 in FIG. 6 comprises the two fiber layers 9, 9' wound in an identical but opposite manner, within the meaning of the present invention, the cross-composite layers can also comprise of more than two fiber layers wound in an identical, but opposite manner.

After the application of the two inner fiber layers 9, 9' wound in an identical but opposite manner, a further fiber bundle 10 is wound onto the fiber layer 9' in a further processing step, with the fiber bundle 10 forming an angle $\beta$ with respect to the longitudinal axis 8 which is substantially smaller than the angle $\alpha$. Furthermore, the fiber layer created by the winding of fiber bundles 10 and forming a damping fiber layer 11 (FIG. 6) is wound with a substantially lower radial thickness than the fiber layers 9, 9'. Typical values for the radial thickness of damping fiber layer 11 can be, for example, about 0.1 to 0.5 mm. The damping fiber layer 11 is preferably wound in one layer to achieve the minimum possible radial thickness. A multi-layer winding with a uniform winding angle β is generally also possible as long as the resulting radial thickness of the damping fiber layer 11 remains low enough.

While the damping fiber layer 11 comprising only fiber bundles 10 wound in one direction, a cross-composite layer 12 (FIG. 6) is, in turn, wound onto the damping fiber layer 11 and comprises, like the cross-composite layer 19 of two or more fiber layers 13, 13' wound in an identical but opposite manner.

The fiber layers 13, 13' are formed in a similar manner as the formation of the fiber layers 9, 9' by the winding of fiber bundles 14, 14' in the opposite direction, with the winding of the fiber bundle 14 to the fiber layer 13 being indicated.

The fiber bundles 14 are wound onto the damping fiber layer 11 at an angle γ and the fiber bundles 14' at an angle −γ which is greater than the angle α and can be, for example, approximately ±65°. In the same way, a further damping fiber layer 15 is wound onto the cross-composite layer 12 produced and a further cross-composite layer 16 again wound onto this damping fiber layer 15, with these being shown in FIG. 6.

The cross-composite layers 19, 12 and 16 and the damping fiber layers 11 and 15 together form a radially inner connecting layer 17 onto which a radially outer functional layer 18 is applied. The connecting and functional layers 17, 18 shown in FIG. 6 as separated from one another by a broken line 20 together form a covering layer 23 of the roll.

The functional layer 18 can be made in a similar manner to the connecting layer 17, i.e. from several damping fiber layers and cross-composite layers. However, it is also possible for the functional layer 18 to be formed in a conventional manner, for example from a matrix material 21 with fibers 22 embedded therein in the form of a purely cross-winding or from fiber fleeces. In addition, further fillers can be provided in both the functional layer 18 and in the connecting layer 17.

It is generally also feasible for the functional layer 18 to comprise essentially of pure matrix material 21 in order to achieve high elasticity of the functional layer.

The occurrence of barrings is prevented by the use of the extremely flat winding of the damping fiber layers 11, 15. A pressure force acting on the outside of the covering layer 23 leads to torsion of the damping fiber layers 11 and 15 due to the flat orientation of the fiber bundles 10. The windings in an identical but opposite manner of the damping fiber layers 11 and 15 separated from one another by the relatively thick cross-composite layer mean that the torsion forces act on them in opposite directions so that the resulting torsion force, which acts on the connecting layer 17, is essentially compensated and the surface of the covering layer 23 remains essentially unaffected by the torsion.

The pressure stresses which occur in operation can thus be absorbed by the damping fiber layers 11, 15 in a roll made in accordance with the invention and translated into torsional forces such that the occurrence of barrings is avoided.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

| Reference numeral list | |
| --- | --- |
| 1 | Fibers |
| 2 | Fibers |
| 3 | Collecting unit |
| 4, 4' | Fiber bundles |
| 5 | Impregnating device |
| 6 | Matrix material |
| 7 | Roll core |
| 8 | Longitudinal axis |
| 9, 9' | Fiber layers |
| 10 | Fiber bundles |
| 11 | Damping fiber layer |
| 12 | Cross-composite layer |
| 13, 13' | Fiber layers |
| 14, 14' | Fiber bundles |
| 15 | Damping fiber layer |
| 16 | Cross-composite layer |
| 17 | Connecting layer |
| 18 | Functional layer |
| 19 | Cross-composite layer |
| 20 | Broken line |
| 21 | Matrix material |
| 22 | Fibers |
| 23 | Covering layer |

What is claimed:

1. A roll having a hard roll core and an elastic covering layer on the outside of said core, said elastic covering layer comprising:

a plurality of fiber layers lying radially on top of one another; and a soft matrix material with fibers embedded therein;

wherein fibers of each said fiber layer extend at an angle to a longitudinal axis of said roll core and essentially parallel to one another, wherein said plurality of fiber layers includes at least two cross-composite layers, each cross-composite layer formed by at least two fiber layers lying on top of one another in which fibers of one of said at least two fiber layers are oriented in an identical but opposite manner to fibers of an adjacent layer of said one of said at least two fiber layers, and wherein said plurality of fiber layers also includes a damping fiber layer with fibers of a uniform angular position located between said at least two cross-composite layers, and an angular position of the damping fibers is substantially flatter, with respect to a longitudinal axis, than angular positions of the fibers of the cross-composite layers.

2. The roll according to claim 1, wherein said roll is used for smoothing paper webs.

3. The roll according to claim 1, wherein said roll core comprises metal.

4. The roll according to claim 1, wherein angular positions of said fibers relative to the longitudinal axis of said roll core are symmetrical to a cross-sectional surface of said roll.

5. The roll according to claim 1, wherein said fiber layers of said cross-composite layers are each formed in multiple layers.

6. The roll according to claim 2, wherein said fiber layers of said cross-composite layers comprise several layers of fibers wound on top of one another, with fibers of each said fiber layer each having an essentially uniform angular position.

7. The roll according to claim 1, wherein said damping fiber layer is made in one layer.

8. The roll according to claim 1, wherein angular positions of said fibers are different in magnitude for different cross-composite layers.

9. The roll according to claim 1, wherein said covering layer comprises at least two cross-composite layers and at least two damping fiber layers.

10. The roll according to claim 9, wherein said covering layer comprises three cross-composite layers.

11. The roll according to claim 1, wherein the outside of said covering layer is formed by a cross-composite layer.

12. The roll according to claim 1, wherein the fibers of two damping fiber layers following one another are wound in an identical but opposite manner.

13. The roll according to claim 12, wherein the radial thickness of said damping fiber layers is smaller than the radial thickness of said cross-composite layers.

14. The roll according to claim 1, wherein said damping fiber layers have a radial thickness of approximately 0.1 mm to approximately 1 mm.

15. The roll according to claim 2, wherein said damping fiber layers have a radial thickness of approximately 0.25 mm to approximately 0.6 mm.

16. The roll according to claim 1, wherein said cross-composite layers have a radial thickness of approximately 1.5 mm to approximately 3 mm.

17. The roll according to claim 2, wherein said cross-composite layers have a radial thickness of approximately 2 mm.

18. The roll according to claim 1, wherein the angular positions of the fibers of radially outer cross-composite layers are steeper, with respect to the longitudinal axis, than the angular positions of the fibers of radially inner cross-composite layers.

19. The roll according to claim 1, wherein the angular positions of the cross-composite layers are approximately ±40° to approximately ±80°.

20. The roll according to claim 1, wherein the angular positions of said damping fiber layers are approximately 3° to 12° or approximately −3° to −12°.

21. The roll according to claim 20, wherein the angular positions of said damping fiber layers are approximately 8° or −8°.

22. The roll according to claim 1, wherein the angular positions of said damping fiber layers are essentially equal in amount.

23. The roll according to claim 1, wherein said covering layer further comprises a radially outer functional layer coupled to said roll core through said at least two cross composite layers.

24. The roll according to claim 1, wherein said matrix material is a plastic.

25. The roll according to claim 24, wherein said matrix material is a plastic one of a thermosetting plastic or a thermoplastic.

26. The roll according to claim 1, wherein said matrix material comprises a resin and hardener combination.

27. The roll according to claim 1, wherein said fibers are combined to fiber bundles or fiber rovings, with one roving in each case comprising a number of fibers of the same kind lying next to one another.

28. The roll according to claim 1, wherein said fibers are made as at least one of glass, carbon, metal and aramide fibers or of mixtures of these fiber materials.

29. The roll according to claim 1, wherein the fiber content of said connecting layer is approximately 40 to 70 vol. %.

30. The roll according to claim 29, wherein the fiber content of said connecting layer is approximately 50 to 60 vol. %.

31. The roll according to claim 1, wherein the fiber content of said functional layer is approximately 5 to 30 vol. %.

32. The roll according to claim 1, wherein the fiber content of said functional layer is approximately 8 to 20 vol. %.

33. The roll according to claim 1, wherein the fibers of at least one of said functional layer and said connecting layer have higher thermal conductivity than said matrix material in which they are embedded.

34. The roll according to claim 23, wherein said covering layer comprises a radially inner connecting layer composed of at least said at least two cross-composite layers, and said inner connecting layer is arranged to couple said functional layer to said roll core.

35. The roll according to claim 34, wherein said functional layer comprises cross-composite layers and damping fiber layers.

36. A roll having a hard roll core and an elastic covering layer on the outside of said core, said elastic covering layer comprising:
   a soft matrix material with fibers embedded therein; and
   a plurality of fiber layers arranged to form at least two cross-composite layers, in which each of said cross-composite layers comprises at least two fiber layers lying radially on top of one another such that fibers of each individual fiber layer of each cross-composite layer are oriented identically but in opposite directions; and
   said plurality of fiber layers being further arranged to form a damping fiber layer with fibers arranged at a uniform angular position and said damping fiber layer being located between said at least two cross-composite layers, such that an angular position of the fibers of said damping fiber layer is substantially flatter, relative to a longitudinal axis, than angular positions of the fibers of said at least two cross-composite layers.

* * * * *